United States Patent
Stojkovic et al.

(10) Patent No.: US 8,550,545 B1
(45) Date of Patent: Oct. 8, 2013

(54) TRUCK FRONT-END SUPPORT FRAME

(75) Inventors: Dragan Stojkovic, Southgate, MI (US);
Gerhard Lueschen, Ypsilanti, MI (US);
Robert Hasse, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/589,500

(22) Filed: Aug. 20, 2012

(51) Int. Cl.
*B62D 25/08* (2006.01)

(52) U.S. Cl.
USPC ............... 296/193.09; 296/203.02; 296/205

(58) Field of Classification Search
USPC ............... 296/205, 203.01–203.04, 193.09
See application file for complete search history.

(56) References Cited

U.S. PATENT DOCUMENTS

| | | | |
|---|---|---|---|
| 6,122,948 A * | 9/2000 | Moses | 72/61 |
| 6,170,906 B1 | 1/2001 | Kasuga | |
| 6,193,274 B1 | 2/2001 | Brown et al. | |
| 6,227,321 B1 | 5/2001 | Frascaroli et al. | |
| 6,416,119 B1 | 7/2002 | Gericke et al. | |
| 6,533,348 B1 | 3/2003 | Jaekel et al. | |
| 6,886,886 B2 | 5/2005 | Seksaria et al. | |
| 6,926,350 B2 | 8/2005 | Gabbianelli et al. | |
| 7,066,533 B2 | 6/2006 | Sohmshetty et al. | |
| 7,574,801 B2 | 8/2009 | Lowe et al. | |
| 7,887,122 B2 | 2/2011 | Baccouche et al. | |
| 2005/0077711 A1 | 4/2005 | Yasui et al. | |

OTHER PUBLICATIONS

Shah, Sanjay, Auto/Steel Partnership, Lightweight Front End Structure—Hydroform Solution and Cost Analysis, www.autosteel.org, date unknown.

* cited by examiner

*Primary Examiner* — Dennis Pedder
(74) *Attorney, Agent, or Firm* — Raymond L. Coppiellie; Brooks Kushman P.C.

(57) ABSTRACT

The present disclosure relates to a vehicle, having: a front-end support frame, including: a driver side rail; and a first bend in the driver side rail configured to change a vertical position of the driver side rail. The driver side rail has a circular cross-sectional configuration in the first bend and a non-circular cross-sectional configuration in another portion of the rail.

20 Claims, 5 Drawing Sheets

TRUCK FRONT-END SUPPORT FRAME

TECHNICAL FIELD

The present disclosure relates to vehicle support frames and methods of manufacturing the same.

BACKGROUND

Conventional truck frame designs are manufactured to sustain heavy loading on the front-end of the truck. Accordingly, many current truck front-end structures have two side tubes on each side of the truck, assembled together to create a side "shotgun" assembly. One example of this is shown in U.S. Pat. No. 6,926,350 titled "Hydroformed Space Frame and Rearward Ring Assembly Therefor." In a two-tube shotgun design the tubes are generally rectangular in shape and typically have a bend diameter of 1.5 inches. The use of multiple tubes requires additional material, fasteners, assembly time and adds weight to the vehicle.

Also two-tube shotgun designs for trucks are typically constructed of steel or other high-strength, cost-effective material in order to sustain loading targets for truck front-end structures. Those loading targets can be in excess of 350 kNm/rad for torsion loading; 250 kN/m for lateral loading; and 450 kN/m for bending. Steel easily satisfies these loading requirements, however, steel weighs substantially more than other materials such as aluminum. Thus the use of a steel shotgun assembly significantly increases the weight of the vehicle and decreases the overall fuel efficiency of the vehicle.

Therefore, it is desirable to have a truck front-end structure that is composed of a lighter weight material in order to improve fuel efficiency. It is also desirable to reduce the number of parts and assembly steps required to manufacturer the front-end structure.

SUMMARY

The present disclosure addresses one or more of the above-mentioned issues. Other features and/or advantages will become apparent from the description which follows.

One exemplary embodiment of the present disclosure relates to a vehicle, having: a front-end support frame, including: a driver side rail; and a first bend in the driver side rail configured to change a vertical position of the driver side rail. The driver side rail has a circular cross-sectional configuration in the first bend and a non-circular cross-sectional configuration in another portion of the rail.

Another exemplary embodiment of the present disclosure relates to a truck front-end support frame, including: a driver side rail and a passenger side rail. The side rails have a bend configured to change a vertical position of the rails. The side rails have a circular cross-sectional configuration in the bend and a non-circular cross-sectional configuration in another portion of the rails.

Yet another exemplary embodiment of the present disclosure relates to a method of manufacturing a truck front-end support frame, including: (i) forming a first side rail to have a first portion with a rectangular cross-sectional configuration and a second portion with a circular cross-sectional configuration; and (ii) forming a first bend in the second portion of the first rail.

One advantage of the present disclosure is that it provides a substantially lighter weight truck front-end structure and thus improves the fuel efficiency of the vehicle. In some embodiments the truck front-end frame weight was reduced by 411 bs or 20.51 bs on both the driver and passenger sides of the frame.

Another advantage of the present disclosure is that it provides a truck assembly composed of fewer components than prior designs. Accordingly, the manufacturing steps and assembly time are drastically reduced by utilizing the present teachings. Significant manufacturing, tooling and shipping costs were also appreciated.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
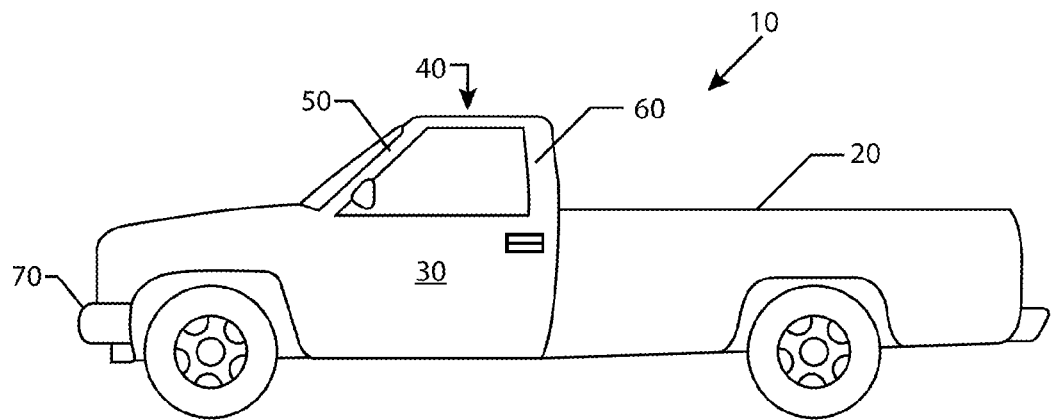
FIG. 1 is a side view of a truck compatible with the present teachings.

Referring to the drawings, wherein like characters represent examples of the same or corresponding parts throughout the several views, there is shown an exemplary truck front-end support frame. The truck front-end support frame is configured for use on a truck or larger sports utility vehicle. Traditionally truck front-end support frames are made of multiple tube shot gun assemblies and are composed of steel. The exemplary truck front-end support frame disclosed herein provides a single tube shotgun design which significantly reduces weight, assembly time and part costs. Additionally, the exemplary truck front-end support frame illustrated herein is composed of a lighter weight material than steel, which has additional fuel-saving benefits.

With the replacement of multiple tubes in the shotgun assembly with a single larger diameter tube, several design challenges surfaced. For example, finding the appropriate gauge thickness and cross-sectional dimensions for the tube required experimentation. An increase in gage comes with a weight and/or cost penalty. Also, the cross-sectional configuration for the tube was changed in order to accommodate packaging needs for the tube while still managing load requirements, which can also limit gage options. Replacing two tubes with one single tube can require the single tube to have a larger diameter in order to achieve equivalent stiffness. The greater the tube diameter, however, the more difficulty is to package the tube in the vehicle front-end environment.

Figure 2:
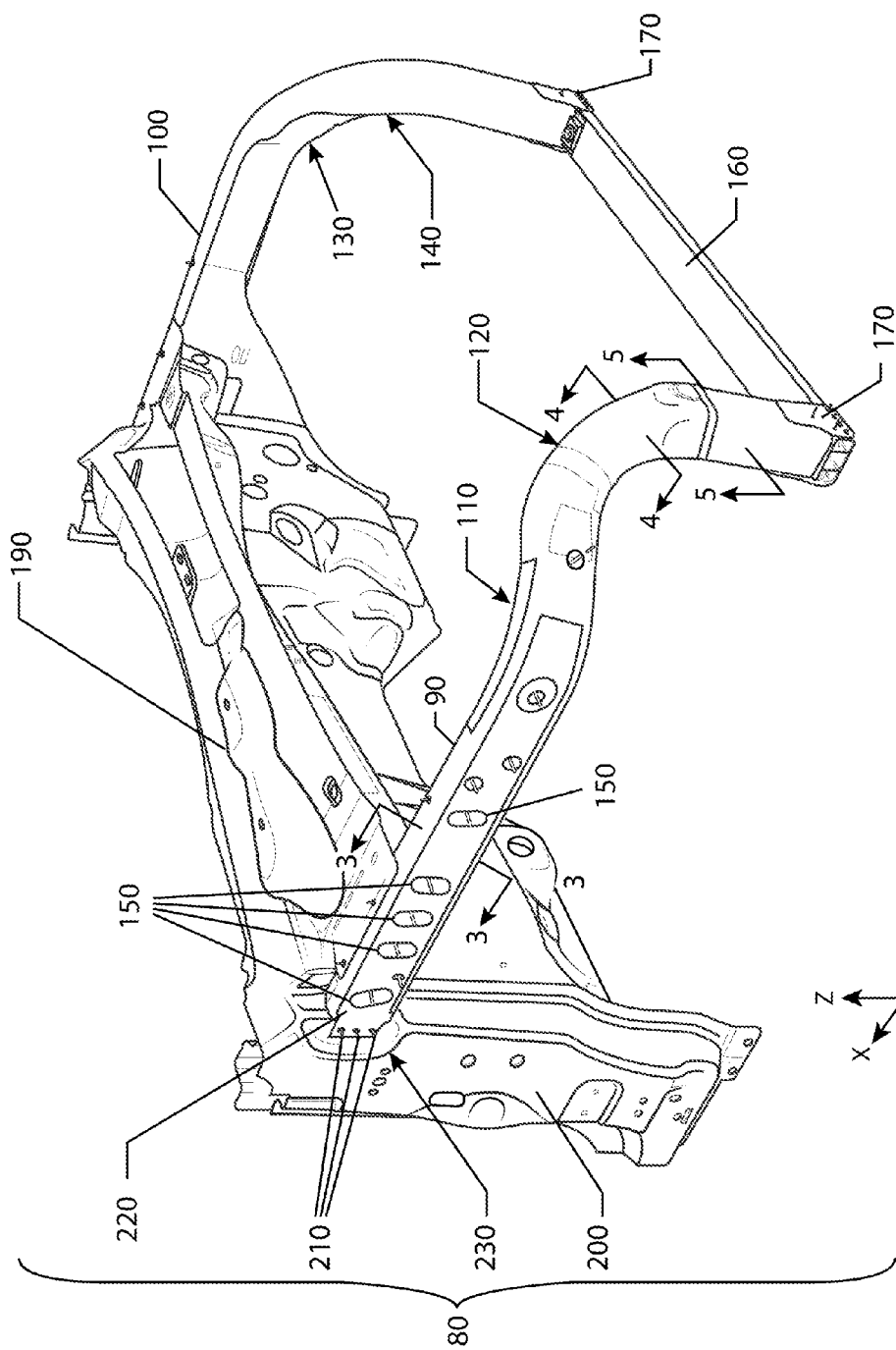
FIG. 2 is a perspective view of a truck front-end support frame according to an exemplary embodiment of the present disclosure.

Referring now to FIG. 1, there is shown therein a vehicle 10 compatible with the present teachings. The vehicle 10 is a pick-up truck with truck bed 20 in the rear section of the vehicle. The side view illustrates the driver side 30 of the vehicle. A passenger cabin 40 is defined by a hinge pillar (or A-pillar) 50 and B-pillar 60. Between the A-pillar 50 and a front bumper 70 is a front-end support frame for the truck (e.g., 80 as shown in FIG. 2). The front-end structure is enclosed with sheet metal in FIG. 1. Though, the vehicle 10 is shown as a pick-up truck any type of vehicle can benefit from the present teachings including, for example, extended-cab pick-up trucks, vans, commercial vehicles, sports-utility vehicles or all-utility vehicles.

Referring now to FIG. 2, there is shown a front-end support frame 80 compatible with the pick-up truck 10 shown in FIG. 1. Front-end support frame 80 of FIG. 2 structurally supports the front-end of the vehicle. Front-end support frame 80 meets loading targets in excess of 350 kNm/rad for torsion loading; 250 kN/m for lateral loading; and 450 kN/m for bending. Front-end support frame 80 is composed of two side rails—one on the passenger side of the vehicle, rail 90, and one on the driver side of the vehicle, rail 100. Front-end support frame 80 is a part of a body-on-frame design. In the illustrated embodiment, the side rails 90, 100 are separate structure. Side rails 90, 100 are not formed as one unitary member (or in a "unibody").

Figure 3:
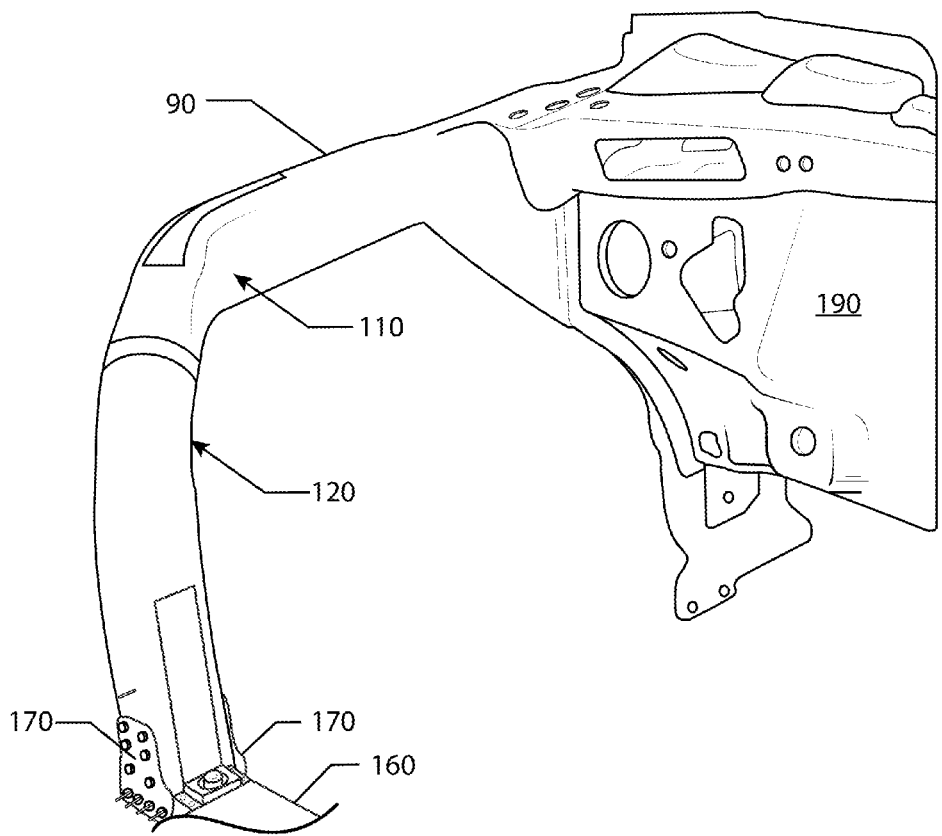
FIG. 3 is another perspective view of the truck front-end support frame of FIG. 2.
Figure 4:
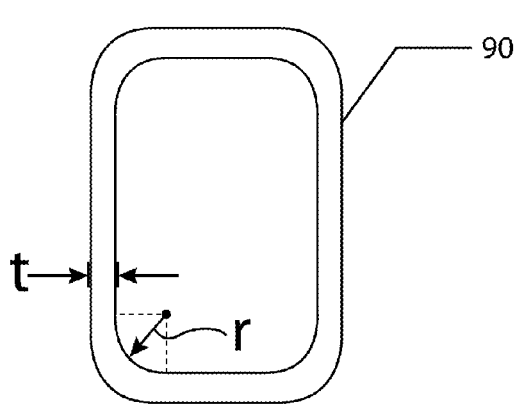
FIG. 4 is a cross-sectional view of a side rail in the truck front-end support frame of FIG. 2, taken at line 4-4.

Side rails 90, 100, as shown in FIGS. 2-3, are composed of aluminum in this embodiment. Rails 90, 100 are hydro-formed. Rails 90, 100 are configured to have bends and a variable cross-sectional configuration. In this embodiment, side rails 90, 100 have two bends. Bend 110 in rail 90 turns the rail counterclockwise with respect to a vertical axis, z, as shown in FIG. 2. Bend 110 changes the lateral position of rail or the position of rail with respect to a lateral axis, y, as shown. In the section of the rail 90 that precedes bend 110 as well as in bend, side rail has a rectangular or non-circular cross-sectional configuration (as shown in FIG. 4).

Figure 5:
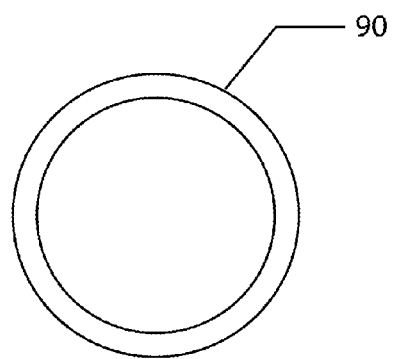
FIG. 5 is a cross-sectional view of a side rail in the truck front-end support frame of FIG. 2, taken at line 5-5.
Figure 6:
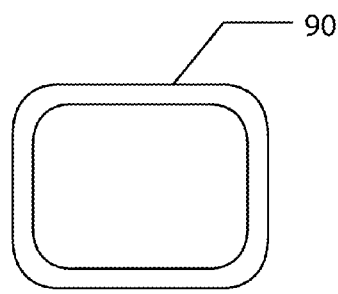
FIG. 6 is a cross-sectional view of a side rail in the truck front-end support frame of FIG. 2, taken at line 6-6.

Another bend 120 is formed in rail 90, as shown in FIG. 2-3. Bend 120 is a vertical bend configured to change the vertical position of side rail 90. As shown, rail 90 is turned downward with respect to the z-axis at bend, as shown in FIG. 2. In bend 120, rail 90 has a circular cross-sectional configuration (as shown in FIG. 5). The cross-sectional configurations of rail 90 changes from the sections preceding bend to the bend. The circular cross-sectional configuration of bend 120 assists in turning side rail 90 at a sharp angle without straining rail material, given the cross-section size of rail. As shown, rail turns approximately 90 degrees at bend 120 so that the last portion of rail is substantially vertical and the first portion of rail is substantially horizontal. After bend 120, the cross-sectional configuration of rail 90 is substantially square, i.e., non-circular (as illustrated in FIG. 6).

In the illustrated embodiment of FIGS. 2-3, side rail 90 and side rail 100 are minor images of each other. Side rail 100 is turned clockwise with respect to the vertical axis of the vehicle at bend 130. Rail 100 turns approximately 90 degrees at bend 140 so that the last portion of rail is substantially vertical and the first portion of rail is substantially horizontal.

Rails 90, 100 include a plurality of attachment access apertures 150. Apertures 150 are formed along a longitudinal section of rail 90 (as shown) or the section that is parallel to the longitudinal axis, x, as labeled. A weld gun or power tool, for example, can access any side of the rail through apertures 150. Various attachment schemes can be utilized with rails.

Figure 7:
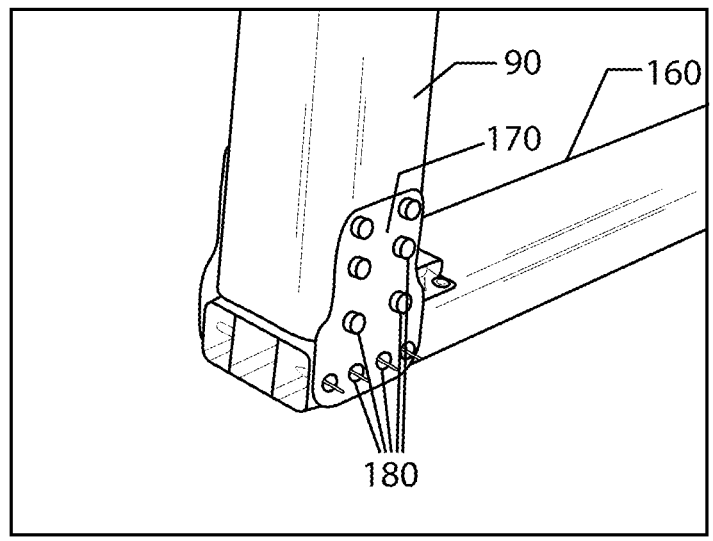
FIG. 7 is another perspective view of the truck front-end support frame of FIG. 2, showing a lateral rail attachment.
Figure 8:
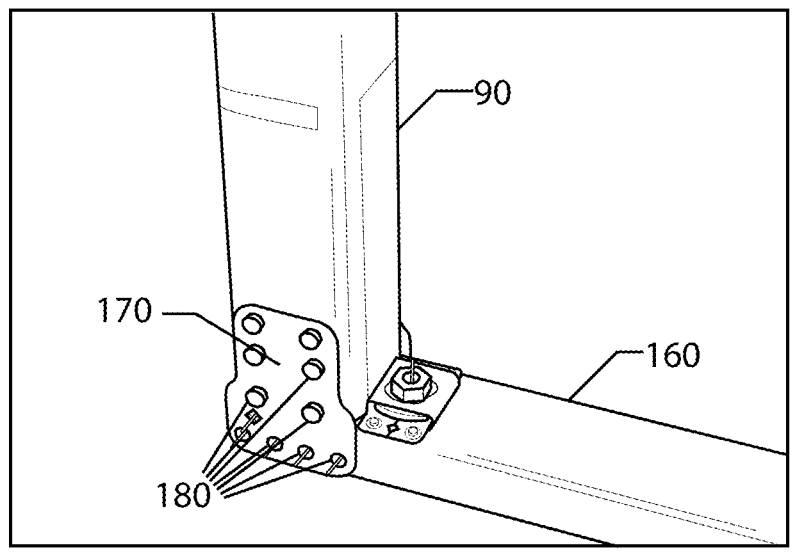
FIG. 8 is another perspective view of the lateral rail attachment of FIG. 7.

The ends of rails 90, 100 each attach to a lateral rail 160, as shown in FIGS. 2-3. A bracket 170 is used to attach sides of the rails 90, 100 to the lateral rail 160. Fasteners 180 are incorporated into the assembly, as shown in FIGS. 7-8. Fasteners 180 can be, for example, rivets, screws, bolts or other fasteners. In the illustrated embodiment, lateral rail 160 is used as a radiator support. Though the radiator is not show, the radiator sits atop rail 160 when installed. Lateral rail 160 is composed of steel in this embodiment but can be composed of other materials, e.g., aluminum or titanium. Rail includes reinforcement, which in the illustrated embodiment is a series of vertically extending crush ribs (as shown in FIG. 7). Other reinforcements can be juxtaposed between the inner surfaces of rail 160 including, but not limited to, a spacer crush tube, crush cans, or energy absorbing foam.

Each side rail 90, 100 is attached to a dash support 190, as shown in FIGS. 2-3. Dash support 190 covers the front of the passenger cabin and the lower hinge pillar 200. Side rails 90, 100 are attached to dash support 190, in this embodiment, with fasteners 210 at an overhang flange 220 formed into the rails 90, 100. Dash support 190 is formed with a recess 230 to provide vertical support to side rail 90. In other embodiments, dash support 190 includes an orifice through which side rail can at least partially fit.

Side rails 90, 100 can be composed of other materials including, for example, titanium, magnesium or boron steel.

The illustrated front-end support can be manufactured using the following method of manufacture. The exemplary method of manufacturing a truck front-end support frame, includes: (i) forming a first side rail to have a first portion with a rectangular cross-sectional configuration and a second portion with a circular cross-sectional configuration; and (ii) forming a bend in the first side rail in the second portion. Either the passenger side rail or driver side rails discussed with respect to FIGS. 2-3 can be formed in this manner. Changing the cross-sectional configuration of the side rail in the bend can be performed via hydro-forming a tube and varying the tube die in the desired sections of the tube. Stamping or other processes can also be used.

With this method the side rails are formed separately from each other to form a body-on-frame design rather than a unibody construction. Each rail has a portion with a rectangular cross-sectional configuration and a portion with a circular cross-sectional configuration. A bend is formed in the portion having a circular cross-sectional configuration, e.g., as shown in FIGS. 2-3.

In one version of the method a bend radius is formed in the side rails. Exemplary bend radii are shown in FIGS. 4 and 6. In FIG. 4, the bend radius of rail is approximately 4 inches. In prior designs where a plurality of side rails were configured to provide at least the same amount of support as the side rails, the bend radius was 3 inches. Thus the bend radius for side rail in this section of the rail increased by 133% or equal to 1.3 times prior bend radius. In a section of the rail, the bend radius is approximately 2 inches. The thickness:bend-radius ratio is 2.3 with the single aluminum rail design (t-to-r as shown in FIG. 4). With multiple rail steel shotgun assemblies the thickness:bend-radius ratio is 1.5.

The method can also include connecting the side rails via a lateral rail. In the shown embodiment, an attachment bracket is used to attach lateral rail to the side rails. Lateral rail is formed separate from the side rails and can be formed via hydro-forming, extrusion or a stamping process, for example. As shown in FIGS. 2-3 the exemplary truck front-end support frame includes attachment access apertures in the driver and passenger side rails. Apertures can be formed via a stamping process, for example.

The disclosed truck front-end frame support has additional benefits. A single larger tube provides a larger circumference for optimization of section. By having a single larger tube for the shotgun assembly section properties can more readily be designed to optimize height or width and to achieve desired noise, vibration, harshness and/or stiffness requirements. A larger cross-sectioned tube also resolves inherent issues with hydro-forming thicker gage materials, such as accommodating corner radii and formability targets incumbent with using smaller tubes with thicker material.

Those familiar with the art to which this invention relates will recognize various alternative designs and embodiments for practicing the invention within the scope of the appended claims.

We claim:

1. A vehicle, comprising:
    a front-end support frame, including:
        a driver side rail; and
        a first bend of substantially 90 degrees in the driver side rail configured to change a vertical position of the driver side rail;
        wherein the driver side rail has a circular cross-sectional configuration in the first bend and a non-circular cross-sectional configuration in another portion of the rail.

2. The vehicle of claim 1, further comprising:
    a passenger side rail having a second bend configured to change a vertical position of the passenger side rail;
    wherein the passenger side rail has a circular cross-sectional configuration in the second bend and a non-circular cross-sectional configuration in another portion of the rail.

3. The vehicle of claim 2, wherein the side rails are composed of aluminum.

4. The vehicle of claim 2, further comprising:
    a lateral rail, separate from the driver and passenger side rails and configured to connect the side rails.

5. The vehicle of claim 4, wherein the lateral rail is a radiator support.

6. The vehicle of claim 2, wherein the side rails include attachment-tool access apertures.

7. A truck front-end support frame, including:
    a driver side rail and a passenger side rail;
    wherein the side rails have a bend of substantially 90 degrees configured to change a vertical position of the rails;
    wherein the side rails have a circular cross-sectional configuration in the bend and a rectangular cross-sectional configuration in another portion of the rails.

8. The truck front-end support frame of claim 7, wherein the side rails are separate structure.

9. The truck front-end support frame of claim 7, wherein the side rails are attached to a dash support.

10. The truck front-end support frame of claim 9, wherein the side rails are composed of aluminum.

11. The truck front-end support frame of claim 7, wherein the side rails include attachment access apertures.

12. The truck front-end support frame of claim 7, further comprising:
    a lateral rail connecting the side rails.

13. A method of manufacturing a truck front-end support frame, including:
    forming a first side rail to have a first portion with a rectangular cross-sectional configuration and a second portion with a circular cross-sectional configuration; and
    forming a first bend of substantially 90 degrees in the second portion of the first side rail.

14. The method of claim 13, further comprising:
    forming a second side rail, separate from the first rail.

15. The method of claim 14, further comprising:
    forming the second side rail to have a third portion with a rectangular cross-sectional configuration and a fourth portion with a circular cross-sectional configuration; and
    forming a second bend in the second side rail in the fourth portion.

16. The method of claim 14, wherein forming the first or second side rail is performed via hydro-forming.

17. The method of claim 15, further comprising:
    forming a bend radius in the first or third portions of the side rails.

18. The method of claim 17, wherein forming the bend radius includes forming the bend radius equal to at least 133% of a bend radius for a plurality of side rails configured to provide at least the same amount of support as the first or second side rails.

19. The method of claim 15, further comprising:
    forming a lateral rail, separate from the first and second rails; and
    connecting the first and second side rail with the lateral rail.

20. The method of claim 19, further comprising:
    forming attachment-tool access apertures in the first or second side rail.

* * * * *